United States Patent [19]

Gartside

[11] 4,300,998

[45] Nov. 17, 1981

[54] PRE-HEAT VAPORIZATION SYSTEM

[75] Inventor: Robert J. Gartside, Auburndale, Mass.

[73] Assignee: Stone & Webster Engineering Corp., Boston, Mass.

[21] Appl. No.: 165,783

[22] Filed: Jul. 3, 1980

Related U.S. Application Data

[63] Continuation-in-part of Ser. No. 81,126, Oct. 2, 1979, Pat. No. 4,264,432.

[51] Int. Cl.$^3$ ........................ C10G 9/16; C10G 9/18
[52] U.S. Cl. .................................... 208/127; 196/106; 203/88; 208/48 R; 208/364; 422/198; 585/500
[58] Field of Search .................... 208/48 R, 127, 364; 422/198

[56] References Cited

U.S. PATENT DOCUMENTS

| | | | |
|---|---|---|---|
| 3,992,285 | 11/1976 | Hutchings | 208/48 R |
| 4,061,562 | 12/1977 | McKinney et al. | 208/61 |
| 4,085,034 | 4/1978 | Endo et al. | 208/48 R |
| 4,174,273 | 11/1979 | Cros et al. | 208/364 |

*Primary Examiner*—Delbert E. Gantz
*Assistant Examiner*—G. E. Schmitkons
*Attorney, Agent, or Firm*—Morgan, Finnegan, Pine, Foley & Lee

[57] ABSTRACT

A process and system for vaporizing heavy oil prior to thermal cracking in a TRC system having low residence time on the order of 0.05 to 2 seconds, and at a temperature between 1300° and 2500° F.

4 Claims, 2 Drawing Figures

PRE-HEAT VAPORIZATION SYSTEM

CROSS REFERENCE TO RELATED CASE

This is a continuation-in-part of application Ser. No. 081,126, filed Oct. 2, 1979, now U.S. Pat. No. 4,264,432.

BACKGROUND OF THE INVENTION

1. Field of the Invention

This invention relates to pre-heating hydrocarbon feedstock materials prior to cracking the feedstock. More specifically, the invention relates to the vaporization of heavy oils prior to pyrolysis cracking in an apparatus and process of the Thermal Regenerative Cracking (TRC) type which is the subject of U.S. Pat. No. 4,061,562 to McKinney et al.

2. Description of the Prior Art

Production of olefins and, in particular, ethylene has been achieved to a great extent by thermally cracking hydrocarbon feedstock and rapidly quenching the cracked effluent to selectively produce the desirable olefins. Feedstock such as ethane, naphtha and similar materials have provided very desirable hydrocarbon feedstock for cracking to produce olefins.

Recently, the use of heavy oils, such as the vacuum tower distillates from crude oils and hydrocracker feedstocks have been used to produce olefins by thermal cracking or pyrolysis. Several problems attend the cracking of heavy oils to produce olefins. Regardless of the system used, whether it be pyrolysis performed in a tubular furnace or in a reactor tube by the use of heated particulate solids to provide the heat necessary for the endothermic reaction, the pretreatment of heavy oils has become difficult and expensive.

Therefore, it is desirable and, in fact, necessary as a practical matter to preheat the heavy oil or any liquid hydrocarbon feedstock to a reaction inlet temperature of 1,100° F. Typically, steam is used as a diluent and to provide the heat necessary to vaporize the feedstock to achieve the proper inlet reaction temperature and phase condition. At present, preheating of the hydrocarbon feedstock is achieved by flashing the hydrocarbon feedstock with steam at a relatively high temperature; i.e. 1,400° F. for heavy feed (1,053° F. for typical light feeds). Conventionally, the hydrocarbon liquid is first heated in indirect heat exchange relationship to about 440° to 500° F. The heated liquid is then mixed with the superheated steam and flashed to 1,100° F. from the vaporization mix temperature of 720° F. This flashing is necessary since liquid hydrocarbon can not be totally vaporized by indirect exchange without incurring significant fouling of the equipment. In the case of heavy oils, the steam of hydrocarbon ratio is necessarily about 1:1. Because of the nature of the heavy oil feedstock, a relatively high temperature (1,400° F.) and a high steam to hydrocarbon ratio of 1:1 is required to provide the necessary vaporization heat.

With particular reference to the above mentioned TRC apparatus and process, it is noted the TRC has maximum economic advantages when cracking heavy feedstocks (650° F. end-boiling point) at low steam dilutions. In TRC systems having low residence times (i.e. between 0.05 to 2 seconds, at temperatures in the range of 1300° to 2500° F.), selectivity is favored by rapid and intimate mixing which is best accomplished with a vapor feed according to the subject invention, rather than a liquid feed.

SUMMARY OF THE INVENTION

It is an object of this invention to provide a system for preheating and vaporizing heavy oils for use as feedstock to produce olefins in a TRC system having low residence times.

It is another object of the present invention to provide a preheat and vaporization system for heavy oil which requires considerably less heat, energy and steam to achieve the reaction inlet temperature of 1,100° F.

Thus, the system and process of the present invention includes a section for initially heating and heavy oil to temperatures of about 440° to 700° F. Thereafter, the heated heavy oil is delivered to a mixing section wherein superheated dilution steam is mixed with the heavy oil and the heavy oil steam mixture is flashed. The flashed mixture is then delivered to a separator wherein the overhead is separated from the liquid bottoms. The overhead contains all of the steam and a portion of the hydrocarbon. The equilibrium temperature in a separator is generally in the range of 700° to 800° F. As such, the portion of the hydrocarbon flashed and taken with the steam overhead ranges up to 60 percent of the total hydrocarbon. The bottoms taken from the separator are then delivered to a mixer. The overhead is heated in a steam superheater to a temperature to about 1,100° to 1,150° F., the criticality being that the temperature must not reach cracking temperature since the gas phase passing through the superheater contains considerable hydrocarbon. The 1,100° F. steam-hydrocarbon mixture and the 700° to 800° F. liquid bottoms from the separator are mixed and flashed to provide a composite mixture of hydrocarbon and steam at about 1,000° F. The 1,000° F. mixture is delivered to the reactor or first passed through a knockout drum to remove any of the entrained liquid.

DESCRIPTION OF THE PREFERRED EMBODIMENT

Figure 1:
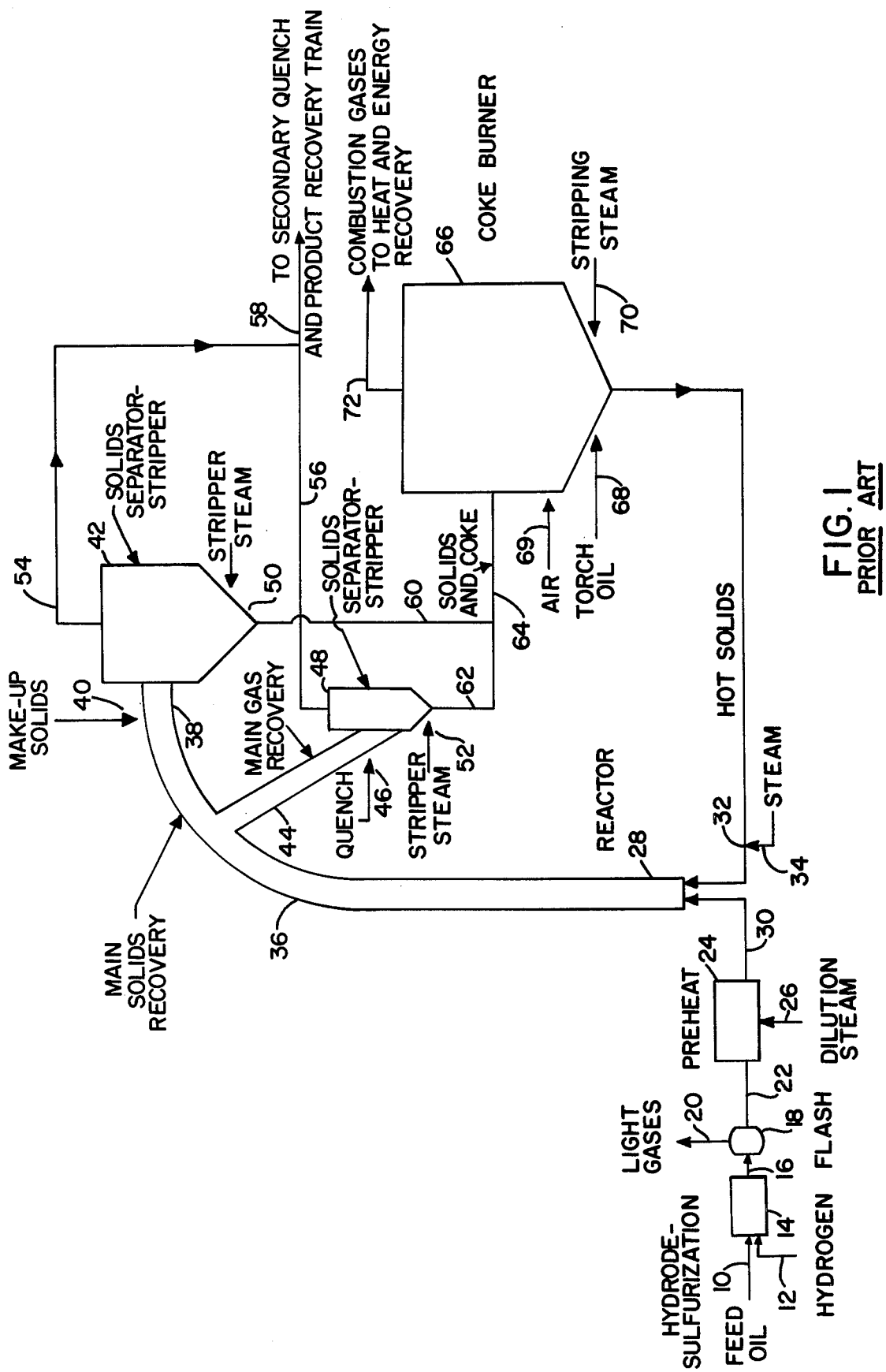
FIG. 1, is a schematic diagram of a TRC system and process according to the prior art.
Figure 2:
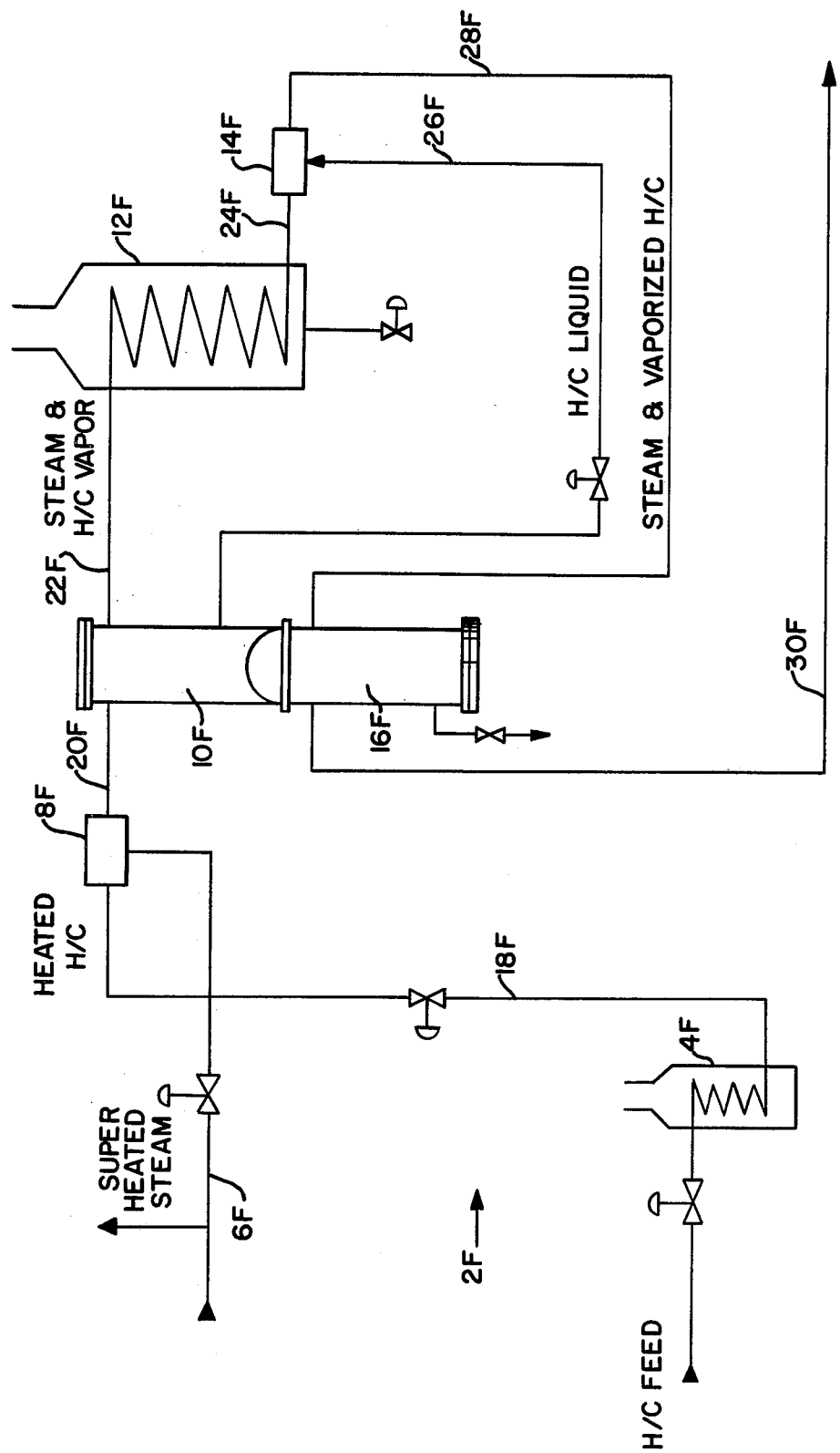
FIG. 2 is a schematic diagram of the system of the invention for vaporizing heavy oil.

Turning to FIG. 2, the system 2F and process of the subject invention as shown in the drawing depicts the various stages at which the hydrocarbon and steam are mixed and heated to effect a resultant vaporized hydrocarbon feed suitable for delivery to a hydrocarbon cracking unit of a TRC system of the type illustrated in FIG. 1.

Referring to FIG. 1, in the prior art TRC process and system as described in U.S. Pat. No. 4,061,562, the disclosure of which is incorporated herein by reference, thermal cracker feed oil or residual oil, with or without blended distillate heavy gas, entering through line 10 and hydrogen entering through line 12 pass through hydrodesulfurized zone 14. Hydrosulfurization effluent passes through line 16 and enters flash chamber 18 from which hydrogen and contaminating gases including hydrogen sulfide and ammonia are removed overhead through line 20, while flash liquid is removed through line 22. The flash liquid passes through preheater 24, is admixed with dilution steam entering through line 26 and then flows to the bottom of thermal cracking reactor 28 through line 30.

A stream of hot regenerated solids is charged through line 32 and admixed with steam or other fluidizing gas entering through line 34 prior to entering the bottom of riser 28. The oil, steam and hot solids pass in entrained flow upwardly through riser 28 and are discharged through a curved segment 36 at the top of the riser to induce centrifugal separation of solids from the effluent stream. A stream containing most of the solids passes through riser discharge segment 38 and can be mixed, if desired, with make-up solids entering through line 40 before or after entering solids separator-stripper 42. Another stream containing most of the cracked product is discharged axially through conduit 44 and can be cooled by means of a quench stream entering through line 46 in advance of solids separator-stripper 48.

Stripper steam is charged to solids separators 42 and 48 through lines 50 and 52, respectively. Product streams are removed from solids separators 42 and 48 through lines 54 and 56, respectively, and then combined in line 58 for passage to a secondary quench and product recovery train, not shown. Coke-laden solids are removed from solids separators 42 and 48 through lines 60 and 62, respectively, and combined in line 64 for passage to coke burner 66. If required, torch oil can be added to burner 66 through line 68 while stripping steam may be added through line 70 to strip combustion gases from the heated solids. Air is charged to the burner through line 69. Combustion gases are removed from the burner through line 72 for passage to heat and energy recovery systems, not shown, while regenerated hot solids which are relatively free of coke are removed from the burner through line 32 for recycle to riser 28. In order to produce a cracked product containing ethylene and molecular hydrogen, petroleum residual oil is passed through the catalytic hydrodesulfurization zone in the presence of hydrogen at a temperature between 650° F. and 900° F., with the hydrogen being chemically combined with the oil during the hydrocycling step. The hydrosulfurization residual oil passes through the thermal cracking zone together with the entrained inert hot solids functioning as the heat source and a diluent gas at a temperature between about 1300° F. and 2500° F. for a residual time between about 0.05 to 2 seconds to produce the cracked product and ethylene and hydrogen.

Again referring to FIG. 2, in lieu of preheat zone 24 (FIG. 1) of the system 2F of the subject invention is embodied in a TRC system and is comprised of essentially a liquid feed heater 4F, a mixer 8F for flashing steam and the heated feedstock, a separator 10F to separate the flashed gas and liquid, a vapor feed superheater 12F, and a second mixer 14F for flashing. The system also preferentially includes a knockout drum 16F for the preheated vapor.

The liquid feed heater 4F is provided for heating the hydrocarbon feedstock such as desulfurized Kuwait HGO to initially elevate the temperature of the feedstock.

The initial mixer 8F is used in the system 2F to initially flash superheated steam from a steam line 6F and the heated feedstock delivered from the liquid feed heater 4F by a line 18F.

The system separator 10F is to separate the liquid and vapor produced by flashing in the mixer 8F. Separated gas is discharged through a line 22F from the separator overhead and the remaining liquid is discharged through a line 26F.

A vapor feed superheater 12F heats the gaseous overhead from the line 22F to a high temperature and discharges the heated vapor through a line 24F.

The second mixer 14F is provided to flash the vaporized gaseous discharge from the vapor feed superheater 12F and the liquid bottoms from the separator 10F, thereby vaporizing the composite steam and feed initially delivered to the system 2F.

A knockout drum 16F is employed to remove any liquid from the flashed vapor discharged from the second mixer 14F through the line 28F. The liquid-free vapor is delivered to a reactor through the line 30F.

In the subject process, the heavy oil liquid hydrocarbon feedstock is first heated in the liquid feed heater 4F to a temperature of about 440° to 700° F. The heated heavy oil hydrocarbon feedstock is then delivered through the line 18F to the mixer 8F. Superheated steam from the line 6F if mixed with the heated heavy oil hydrocarbon feedstock in the mixer 8F and the steam-heavy oil mixture is flashed to about 700° to 800° F. For lighter feedstock the flashing temperature will be about 500° to 600° F., and for heavier feedstock the flashing temperature will be about 700° to 900° F.

The flashed mixture of the steam and hydrocarbon is sent to the system separator 10F wherein the vapor or gas is taken overhead through the line 22F and the liquid is discharged through the line 26F. Both the overhead vapor and liquid bottoms are in the temperature range of about 700° to 800° F. The temperature level and percent of hydrocarbon vaporized are determined within the limits of equipment fouling criteria. The vapor stream in the line 22F is comprised of essentially all of the steam delivered to the system 2F and a large portion of the heavy oil hydrocarbon feedstock. Between 30% and 70% of the heavy oil hydrocarbon feedstock supplied to the system will be contained in the overhead leaving the separator 10F through the line 22F.

The steam-hydrocarbon vapor in the line 22F is delivered to the system vapor feed superheater 12F wherein it is heated to about 1,030° F. The heated vapor is taken from the vapor feed superheater 12F through the line 24F and sent to the second mixer 14F. Liquid bottoms from the separator 10F is also delivered to the second mixer 14F and the vapor-liquid mix is flashed in the mixer 14F to a temperature of about 1,000° F.

The flashed vapor is then sent downstream through the line 28F to the knockout drum 16F for removal of any liquid from the vapor. Finally, the vaporized hydrocarbon feed is sent through the line 30F to a reactor.

An illustration of the system preheat process is seen in the following example.

A Nigerian Heavy Gas Oil is preheated and vaporized in the system 2F prior to delivery to a reactor. The Nigerian Heavy Gas Oil has the following composition and properties:

| Elemental Analysis, Wt. % | | Properties | |
|---|---|---|---|
| Carbon | 86.69 | Flash Point, F. | 230.0 |
| Hydrogen | 12.69 | Viscosity, SUS 210° F. | 44.2 |
| Sulfur | .10 | Pour Point, F. | +90.0 |
| Nitrogen | .047 | Carbon Residue, Ramsbottom | .09 |
| Nickel | .10 | Aniline Point, C. | 87.0 |
| Vanadium | .10 | | |
| Distillation Vol. % | | | |
| IBP | | | |
| 10 | 669.2 | | |

| | -continued |
|---|---|
| 30 | 755.6 |
| 50 | 820.4 |
| 70 | 874.4 |
| 90 | 944.6 |
| EP | 1,005.8 |

3,108 pounds per hour of the Nigerian Heavy Gas Oil is heated to 750° F. in the liquid feed heater 4F and delivered at a pressure of 150 psia to the mixer 8F. 622 pounds per hour of superheated steam at 1,100° F. is simultaneously delivered to the mixer 8F. The pressure in the mixer is 50 psia.

The superheated steam and Heavy Gas Oil are flashed in the mixer 8F to a temperature of 760° F. wherein 60° of the Heavy Gas Oil is vaporized.

The vapor and liquid from the mixer 8F are separated in the separator 10F. 622 pounds per hour of steam and 1,864.8 pounds per hour of hydrocarbon are taken in line 22F as overhead vapor. 1,243.2 pounds per hour of hydrocarbon are discharged through the line 26F as liquid and sent to the mixer 14F.

The mixture of 622 pounds per hour of steam and 1,864.8 pounds per hour of hydrocarbon are superheated in the vapor superheater 12F to 1,139° F. and delivered through line 24F to the mixer 14F. The mixer 14F is maintained at 45 psia.

The 1,243.2 pounds per hour of liquid at 760° F. and the vaporous mixture of 622 pounds per hour of steam and 1,864.8 pound per hour of hydrocarbon are flashed in the mixer 14F to 990° F.

The vaporization of the hydrocarbon is effected with a steam to hydrocarbon ratio of 0.2. The heat necessary to vaporize the hydrocarbon and generate the necessary steam is 2.924 MM BTU/hr.

The same 3,108 pounds per hour of Nigerian Heavy Gas Oil feedstock vaporized by a conventional flashing operation requires steam in a 1:1 ratio to maintain a steam temperature of 1,434° F. The composite heat to vaporize the hydrocarbon and generate the necessary steam is 6.541 MM BTU/hr. In order to reduce the input energy in the conventional process to the same level as the present invention, a steam temperature of 3,208° F. is required, which temperature is effectively beyond design limitations.

I claim:

1. In a TRC process wherein the temperature in the cracking zone is between 1300° and 2500° F. and wherein hydrosulfurized residual oil along with the entrained inert solids and the diluent gas are passed through a cracking zone for a residence time of 0.05 to 2 seconds, the improvement in the process for preheating the heavy oil hydrocarbon feedstock comprising the steps of:
    a. heating the liquid heavy oil hydrocarbon feedstock;
    b. initially flashing the heated liquid heavy oil hydrocarbon feedstock with steam;
    c. separating the vapor and liquid phases of the flashed liquid heavy oil hydrocarbon feedstock-steam mixture;
    d. superheating the vapor phase of the flashed liquid heavy oil hydrocarbon feedstock-steam mixture; and
    e. flashing the superheated vapor and the liquid phase of the originally flashed liquid heavy oil hydrocarbon feedstock-steam mixture.

2. A process as in claim 1 wherein the initial flashing of the steam and the liquid heavy oil hydrocarbon is at a temperature of 500° to 900° F., the vapor from the initial flashing is superheated to about 1,100° F. and the superheated vapor and liquid from the initial flashing step is again flashed to about 1,000° F.

3. A process as in claim 2 wherein the liquid heavy oil is preheated to 440° to 700° F.

4. In a TRC system wherein the temperature in the cracking zone is between 1300° and 2500° F. and wherein the hydrosulfurized residual oil along with the entrained inert solids and the diluent gas are passed through a cracking zone for a residence time of 0.05 to 2 seconds, the improvement of providing a system for preheating the heavy oil hydrocarbon feedstock comprising:
    a. means for preheating the liquid heavy oil hydrocarbon;
    b. a first mixer for flashing the heated liquid heavy oil hydrocarbon and steam;
    c. a vapor feed superheater for heating the vapors from the first mixer to about 1,030° F.; and
    d. a second mixer for flashing the superheated vapor and the liquid from the first mixer.

* * * * *